United States Patent
Smith (12)

(10) Patent No.: US 10,311,609 B2
(45) Date of Patent: Jun. 4, 2019

(54) METHOD AND SYSTEM FOR THE MAKING, STORAGE AND DISPLAY OF VIRTUAL IMAGE EDITS

(71) Applicant: Clinton B Smith, The Colony, TX (US)

(72) Inventor: Clinton B Smith, The Colony, TX (US)

(73) Assignee: Clinton B. Smith, The Colony, TX (US)

( * ) Notice: Subject to any disclaimer, the term of this patent is extended or adjusted under 35 U.S.C. 154(b) by 94 days.

(21) Appl. No.: 13/717,615

(22) Filed: Dec. 17, 2012

(65) Prior Publication Data

US 2014/0168055 A1    Jun. 19, 2014

(51) Int. Cl.
*G06T 11/60* (2006.01)

(52) U.S. Cl.
CPC .................. *G06T 11/60* (2013.01)

(58) Field of Classification Search
CPC .... G06T 11/001; G06T 11/60; G06T 2200/24
See application file for complete search history.

(56) References Cited

U.S. PATENT DOCUMENTS

| | | | | |
|---|---|---|---|---|
| 5,408,328 A * | 4/1995 | Boliek | ..................... | G06T 9/005 358/452 |
| 6,298,446 B1 * | 10/2001 | Schreiber | .............. | G06F 17/211 726/27 |
| 6,546,558 B1 * | 4/2003 | Taguchi | ............ | G06F 17/30017 707/E17.009 |
| 6,968,077 B1 | 11/2005 | Yamanaka | | |
| 7,065,249 B2 * | 6/2006 | Fushiki | ................... | G06T 11/60 382/167 |
| 7,269,303 B2 | 9/2007 | Miller | | |
| 7,843,592 B2 | 11/2010 | Bodin | | |
| 8,208,762 B1 * | 6/2012 | Berger | ..................... | G06T 11/00 382/302 |
| 8,983,237 B2 * | 3/2015 | Hamburg | ............ | G06F 21/6218 382/305 |
| 2008/0285892 A1 * | 11/2008 | Sposato | .................. | G06T 11/60 382/311 |

(Continued)

OTHER PUBLICATIONS

Dayton, Linnea, and Jack Davis. The Photoshop 5/5.5 Wow! Book. Berkeley, CA: Peachpit, Dec. 2000. Print, Front Cover to p. 360.*

(Continued)

*Primary Examiner* — Jason C Olson

(57) ABSTRACT

Embodiments for a method and system for the making, storage and display of virtual image edits are disclosed. Source/linked image(s) (201*a*) in a web or other computer device (100*a*) environment may be virtually edited and/or combined with one another (102), by individual users, in collaboration with others or an automated program. Only the virtual edit alteration code, including the source image location information, are displayed (108) and saved (410), eliminating image redundancy, as the source images are not truly edited, copied or resaved, but instead remain stored at the copyright holder's disclosed location. Just as the House Of Mirrors in an amusement park changes ones reflection without changing the person, separating the image(s) from the virtual edits improves image load speeds and saves storage space. The said display is dynamically affected should the image copyright holder change or delete one of the source images.

16 Claims, 4 Drawing Sheets

(56) References Cited

U.S. PATENT DOCUMENTS

2013/0314434 A1* 11/2013 Shetterly ................ G09G 5/14
345/593

OTHER PUBLICATIONS

Wikipedia, Picasa—Wikipedia, the free encyclopedia, Nov. 20, 2012, https://en.wikipedia.org/w/index.php?title=Picasa&oldid=52395204, 1-5.*
GitHub, Revisions • .picasa.ini decoded • GitHub, Jul. 9, 2011, https://gist.github.com/fbuchinger/1073823/revisions , 1-4.*
Anonymous, .picasa.in. decoded * Github, https://gist.github.com/fbuchinger/1073823/f815fb65153fdf1e497b95941f8e9f5607fdb634, Jul. 9, 2011.*

* cited by examiner

| | |
|---|---|
| 200 | Help Name The New Puppy <br> Use the form below to pick a name for the puppy. <br> HelpNameTheNewPuppy.com |
| 201a | http://www.martinasweb.com/images/PuppyImage.jpg~obj~ |
| 201b | PuppyName~offset~bottom:180px;center:290px; |
| 201c | color:black;width:250px;~txt~~obj~ |
| 202 | Store and Display Virtual Edits |
| 204a | <br><br>PuppyName            Display of virtual PuppyImage edits |

204b     Actual PuppyImage stored at 201a not HelpNameTheNewPuppy.com 200.

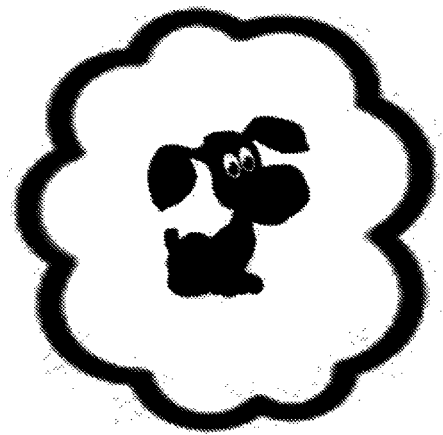

FIG 2

| 300 | Skinny Funny  PuppyName2 | 302 | Big Funny  PuppyName3 |
|---|---|---|---|
| 304 | Hey I'm a Cat Person 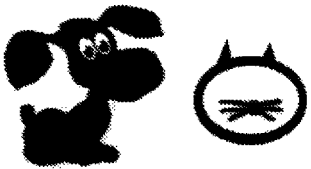 PuppyCatName4 | 305 | Also A Cat Person  CatName5 |
| 306 | Up To 3000 Virtual Edits  etc.  PuppyName3000 | | |
FIG 3

METHOD AND SYSTEM FOR THE MAKING, STORAGE AND DISPLAY OF VIRTUAL IMAGE EDITS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to virtual image edits and more specifically, to making, storing and displaying virtual edits to source images without the alteration of source images.

BACKGROUND

Prior Art

The following is a tabulation of some prior art that is presently appears relevant:

U.S. Patents

| Pat. No. | Date | Patentee |
| --- | --- | --- |
| 7,843,592 | Nov. 30, 2010 | Bodin/Thorson |
| 7,269,303 | Sep. 11, 2007 | Miller |
| 7,065,249 | Jun. 20, 2006 | Fushiki |
| 6,968,077 | Nov. 22, 2005 | Yamanaka |
| 20080285892 | Nov. 20, 2008 | Sposato/Harrington/Massena |

Nonpatent Literature Documents

Electronic and Information Technology Accessibility Standards (Section 508) http://www.access-board.gov/sec508/standards.htm
ESP game 2006 by Luis von Ahn of Carnegie Mellon University https://en.wikipedia.org/wiki/ESP_game In one embodiment the World Wide Web/Internet is inundated with billions of duplicated images/graphics, randomly named, that people with increasing popularity wish to share with one another. Many people may individually or in collaboration with others, wish to make simple edits to images they enjoy, allowing them to better tell their stories and share ideas in a dynamic way. Unfortunately, the technical ability and cost needed to edit images using editing software is out of reach for many online consumers. Many photo editing software programs do not work on the ever increasing number of smaller computing devices, which are in some cases replacing desktop computers. Given the current demand, both internet users and providers find there are also space limitations to the storage of such images, should they be edited, not to mention slower web service due to the uploading and downloading of images. Furthermore, images can be copied multiple times and stored in different server locations without regard to the copyright concerns of the originator.

Instead of reducing the number of online images, many users attempt to give meaningful names to their images upon upload as one way to tackle the random naming issue that makes images hard to identify during online searches. Section 508 compliant websites attach meaningful names to images to allow access to users with visual impairments. A crowd-sourcing online game called "ESP game" was also created by Luis von Ahn to assist in returning better search results for online images. There are some low-cost and shareware software applications available but someone wishing to make a very simple edit to an image may not wish to invest the time to install and learn to use such a program. Many of the photo editing software solutions are not easily or inexpensively adaptable to the smaller device market. Current techniques to solve the storage space and bandwidth problem, as related to images, tend to be restrictive in nature: limits the disc space users and software are allotted, image compression, restrictions of image sizes, storage size limitations, or images being automatically downsized or downsampled. Edit lists are also used to implement image edits remotely and asynchronously. Better, smaller and faster computing power has been the standard way to offer quicker web service, at the expense of increased complexity, as our need to consume online content grows. It is usually left up to the originator of an image to insure copyright protections are not being infringed, websites ask users to honor and use-images-with-permission, watermarking images, online form agreements, and other such techniques are also used.

There exists a need and there is heretofore in the current art, no one technique to alleviate the aforementioned problems. The advantages for one or more aspects of this method and system for the making, storage and display of virtual image edits, obviates image redundancy, allows simple virtual edits to be made and rendered on any web enabled device, virtual edits that don't actually alter any images, separates the display of images from the images themselves, improves speed load times, and insures image copyright holder protections. These and other advantages of one or more aspects will become apparent from consideration of the ensuing description and accompanying drawings.

BRIEF SUMMARY

The disclosed principles provide a method and system for the making, storage and display of virtual image edits. In accordance with one embodiment, linked image(s) in a World Wide Web environment or other medium, may be virtually edited and/or combined with one another, by individual users, in partnership with others or some other automated program. The resulting virtual images are not copied, resaved or even stored on a server because the dynamic virtual edits made and then displayed, are a virtual representation only and the actual physical location of the image(s) remain stored with and at the image(s) copyright holder's disclosed location.

One or more aspects of this system and method prevents image redundancy, allows for cost effective simple virtual edits to be made, producing a virtual image displayed on any web enabled device, enhances image load times, insures image copyright holder protection and saves storage space, as only the systems programming virtual edit code needs to be saved.

BRIEF DESCRIPTION OF THE DRAWINGS

FIG. 2 is one aspect of the method and system's possible user interface.

FIG. 3 is one aspect of the method and system's possible display.

DETAILED DESCRIPTION

FIG. 1

Figure 1:
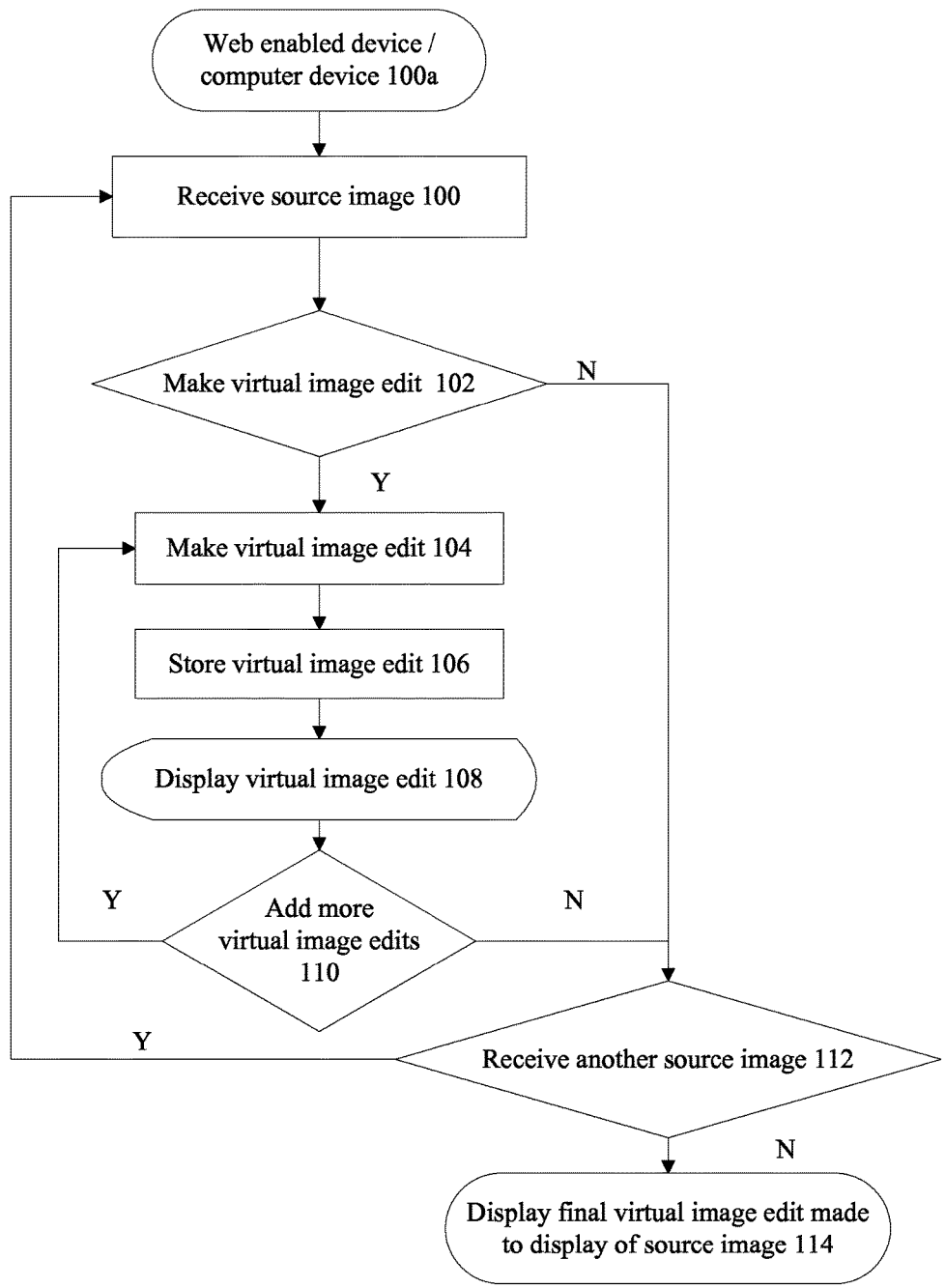
FIG. 1 is a block diagram illustrating the configuration for one or more aspects of this method and system for the making, storage and display of virtual image edits and its implementation.

A method and system for dynamically displaying virtual user input edits to an image or any number of images is provided. In one embodiment here described as a computer device or as an online Website based environment, the method and system for the making, storage and display of virtual image edits is accessed by any computer device/web enabled device 100a and allows a user 100 to receive a link to an image or graphic from a Website/computer. This link is publicly disclosed, giving credit to the image copyright holder. The user then decides if they wish to make a virtual edit to the image 102.

It is possible that a user my not wish to make a virtual edit to the image because they may wish to merge that image with another one or make some other modification with multiple images that leaves one image with no virtual edits. The user then makes whatever virtual edits they wish 104, not to the image itself but rather to the display of that image.

A virtual edit may be one or more or any combination of the following: add caption/text, alter, blend, brighten, change color exposure focus and or saturation, combine, contrast, crop, darken, delete, enhance, filter, manipulate, mask, modify, overlay, resize, rotate, scale, sharpen, soften, transform, translate, and or make some other virtual edit to the image display.

The user stores/saves the virtual image edits 106. The user then renders the virtual edits made 108. The user may then decide to make further virtual edits or not 110. Should the user wish to make more virtual edits then the steps 104, 106, 108 and 110 are repeated until the user is satisfied with the image display results. If the user wishes to select yet another source image link address 112, the process begins again at step 100, if not the final display of the virtually edited image is shown to the user.

The user may return to the Website/computer to view and or virtually edit the image(s) at any time. This system and method, in yet another embodiment, may also be applied to not just one user but a community of users, users working in cooperation or even a computer program.

FIG. 2

A method and system for the making, storage and display of virtual image edits in one embodiment shows a possible user interface using an online browser or other web enabled device as shown in the box on FIG. 2 items 200, 201, 202 and 204a. In this example a Website HelpNameTheNewPuppy.com is soliciting help in naming a new puppy 200. There is a code section 201 (comprising: 201a, 201b & 201c) for receiving virtual edits, in this case, linked to an image called PuppyImage.jpg located at the web address of http://www.martinasweb.com/images/PuppyImage.jpg 201a. This link gives credit to the photographer who took the image by linking directly to her Website.

A virtual edit caption for the name suggestion of Puppy-Name has been added to the bottom center of the Puppy-Image 201b using a black color font 201c. The user, wishing to make no other modifications or additions clicks "Store and Display Virtual Edits" 202 and the virtual edits made are displayed 204a.

In a specific example, as illustrated, the code section 201, including the address location of the source image 204b, is all that is stored at the HelpNameTheNewPuppy.com Website 200, rather than storing the edits along with a copy of the source image 204b, as would be done in conventional approaches.

In summation, no source images of puppies were harmed during the virtual editing process because, the PuppyImage with the PuppyName caption while rendered on the HelpNameTheNewPuppy.com Website is really stored/located someplace else, in this case, at the photographer's website represented as the cloud in 204b. The separation of the virtual edits from the image itself improves load times and nullifies the need for an additional image to be created, edited, saved, named, uploaded and stored, along with respecting the copyright privileges of the photographer. The virtual edit was simple enough to be completed on any Web enabled device that may not have a photo editing software program installed.

FIG. 3

To help explain what is meant by "a virtual edit", imagine as a metaphor a House Of Mirrors in an amusement park, where one mirror makes someone appear fat, another skinny. The person/image standing in front of the mirror, has not changed, what is seen, is merely a reflection of the virtual editing properties of the mirror being displayed to the user. Keeping with the example of FIG. 2 and the "House Of Mirrors" above, FIG. 3 also shows, someone who visits the HelpNameTheNewPuppy.com webpage displaying different likenesses of the same cute new puppy with name suggestions, comments, photo enhancements and etc. 300, 302, 304, 305. In 300 we see a user who has had fun with the PuppyImage by making it appear skinny with a name suggestion of PuppyName2 and adding a caption "Skinny Funny". In 302 another user has made the image appear wide and big with name suggestion PuppyName3 and a caption that reads "Big Funny".

User 304 is more sophisticated and has made virtual edits that add a cat and caption "Hey, I'm a Cat Person" with the name suggestion of PuppyCatName4. User 305 is apparently "Also A Cat Person" because he has replaced the link to the PuppyImage with a new link to a CatImage, adding the name suggestion of CatName5. The CatImage illustrates the dynamic nature in this embodiment for the method and system of virtual image edit displays because it's no longer about the cute puppy, for this user, and possible other users.

Assume the "etc." shown in 306 represents the virtual edits of up to 3000 different people. The possible virtual edits, name suggestions and other comments are as vast as one's imaginings and accomplished with ease, without cloning new images. Web load speeds are improved because in reality only one cute PuppyImage and a few other image links, are loaded to the HelpNameTheNewPuppy.com Webpage, not the normal 3000 individual images. Just as one person can stand in front of many different mirrors in the "House Of Mirrors", it's still the same person made to look fat, skinny, tall, etc.; all the images virtually edited remain as they truly are and where they are, with the copyright holder. The image edits are virtual having nothing to do with the source images they seek to modify, but the displays are real, filled with endless new, dynamic ways to share and exchange ideas, on an ever increasing number of display devices.

FIG. 4

Figure 4:
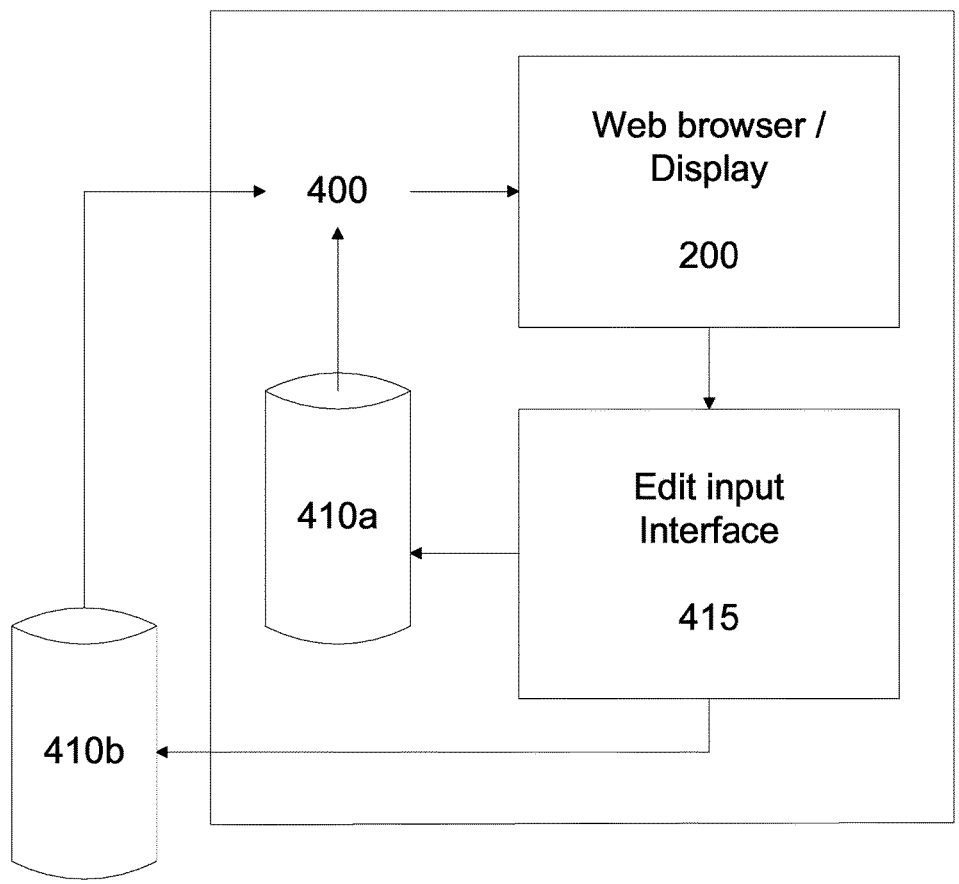
FIG. 4 is shows the machine hardware components for the display of virtual image edits.

A method and system for the making, storage and display of virtual image edits would have the following machine hardware components shown in FIG. 4.

400 is the computer device. Recalling from FIG. 2 that the computer device display, in one embodiment, could comprise a web browser 200, displaying the received source image. The edit input interface represented as 415 is able to receive the virtual edits. The virtual edits and the location of the source image, but not the actual source image, are then stored in memory 410a on the computer device itself or on an external database, server etc. 410b. The virtual edits made to the source image are then dynamically displayed to the user on the display 200.

ADVANTAGES

From the description above, a number of advantages of some embodiments of the method and system for the making, storage and display of virtual image edits become evident:

(a) Linking to already existing images and displaying their virtual edits eliminates the use and creation of replicated online images, while providing a divergent user experience as source images may change.

(b) In one embodiment, a browser enabled user interface will allow simple virtual edits to be made on any web enabled device without the need for additional photo editing software.

(c) Image edits rendered dynamically and virtually, require little additional storage space, as only the virtual edit alteration code and the source image location information is saved, not a new image.

(d) Image load speeds are improved because several users can display their virtual edits to the same source image or series of images.

(e) Images being virtually edited stay as they are and where they are, with the copyright holder.

CONCLUSION, RAMIFICATIONS, AND SCOPE

The practitioner will see that at least one embodiment of the method and system for the making, storage and display of virtual image edits eliminates image redundancy, is usable on any computer device/web enabled device without the need for additional photo editing software, can save storage space, offer quicker web service and help to protect the rights of copyright holders but still allow image editing and creativity to flourish.

While the above description contains much specificity, this should not be construed as limitations on the scope, but rather as an exemplification of one or more embodiments thereof. One skilled in the art will appreciate that many other variations are possible and can be used in many different electronic environments such as with, laptop computers, desktop computers, servers, tablet/surface computing devices, video game consoles, mobile phones, personal digital assistants (PDA's), digital camera, pagers, smart phones, intranet, internet, stand alone software programs, video, 3d rendering, holograms, audio, and various other types of electronic, computing and media devices.

In another example, an embodiment of the method and system for the making, storage and display of virtual image editing may be self-contained within a photo editing software package, where instead of saving virtual image edits as a new image, to save space, only the image display code edits are saved. A further embodiment may contain a photo database or repository of possible source images to be used with this method and system for the making, storage and display of virtual image edits. Other embodiments may hide or not display the image location information due to privacy or other concerns which may result in potential copyright infringements of the system to the photographer. One can envision an embodiment where display screenshots of the virtual edits are made and played back one after the other as a slide show, video or scrolling from top to bottom etc.

It should be understood, that the detailed description is not intended to limit the embodiment to the particular form disclosed, but on the contrary, is to cover all possible embodiments falling within the scope and spirit as defined by the claims.

The invention claimed is:

1. A method for displaying virtual image edits on a computer device, comprising a display, and a storage medium, the method comprising:

providing a user interface (UI) to the computer device from a server, the UI including: a representation of a source image, wherein the source image is not edited, copied, or resaved and an edit input interface for effecting a visual change to the representation of the source image;

receiving an input of at least one virtual image edit via the UI, the at least one virtual image edit corresponding to a visual change to the representation of said source image;

storing on said storage medium, a source image address to the source image and the at least one virtual image edit, wherein the source image is not edited, copied, or resaved;

modifying the representation of the source image based on the input of the at least one virtual image edit stored on said storage medium; and displaying the modified representation of said source image; and dynamically editing representations of other source images or series of images without editing, copying, or resaving the other source images or series of images using the stored at least one virtual image edit.

2. The method of claim 1 wherein the at least one virtual image edit comprises at least one of: adding a caption, adding a text, altering, blending a region, brightening, changing a color, modifying an exposure, modifying a focus, modifying saturation, combining, modifying contrast, cropping, darkening, deleting, enhancing a value, filtering, manipulating, masking, modifying, overlaying, resizing, rotating, scaling, sharpening, softening, transforming, and translating.

3. The method of claim 1 wherein the received input comprises providing a user interface within a web browsing application, and wherein the source image address of the source image is at another computer different from the server.

4. The method of claim 1 wherein the received input comprises input from at least one of: an automated program, an independent user, multiple independent users, and users in collaboration.

5. The method of claim 1 where the computing device is one of: a laptop computer, a desktop computer, a server computer, a tablet computing device, a surface computing device, a video game console, a mobile phone, a personal digital assistant, a digital camera, a pager, and a smart phone.

6. The method of claim 1 wherein the modified representation is dynamically affected should said source image change.

7. A machine for making, storing, and dynamically displaying virtual image edits on a computer device, the machine comprising:

a display, wherein the display renders a source image address of at least one source image, wherein the source image is not edited, copied, or resaved, a user interface (UI) connected to a server comprising an edit input interface for receiving input of at least one virtual image edit using said source image address;

a storage medium, wherein said virtual image edit and said source image address are stored;

wherein said display dynamically renders an altered representation of the source image based on the stored said virtual image edit and said source image address, wherein said source image is not edited, copied, or resaved.

8. The machine-for making, storing, and dynamically displaying virtual image edits of claim 7 wherein the storage is selected from the group consisting of a memory-storage, a photo database, an image database, a data store, a data repository, and a website server.

9. The machine-for making, storing, and dynamically displaying virtual image edits of claim 7 wherein said virtual image edit comprises instructions for at least one of: adding a caption, adding a text, altering, blending a region, brightening, changing a color, modifying an exposure, modifying a focus, modifying saturation, combining, modifying contrast, cropping, darkening, deleting, enhancing a value, filtering, manipulating, masking, modifying, overlaying, resizing, rotating, scaling, sharpening, softening, transforming, and translating.

10. The machine for making, storing, and dynamically displaying virtual image edits of claim 7 wherein said virtual image edit and said source image address are stored using code.

11. A method for displaying virtual image edits on a computer device comprising a display, the method comprising:

providing a user interface (UI) for a computer device connected to a server, the UI including:

a representation of a stored source image, wherein the representation is based on the source image and the source image is not edited, copied, or resaved, a source image address of the source image, and an edit input interface for effecting a visual change to the representation of the source image;

means for storing, on a storage medium, the source image address to the source image, receiving an input of at least one virtual image edit via the UI, the input corresponding to a visual change to the representation of the source image;

means for storing, on the storage medium, the virtual image edit, wherein, the source image is not edited, copied, or resaved;

modifying the representation of the source image based on the virtual image edit stored on said storage medium; and displaying the modified representation of the source image without editing, copying, or resaving the source image.

12. The method of claim 11 wherein said virtual image edit comprises at least one of: adding a caption, adding a text, altering, blending a region, brightening, changing a color, modifying an exposure, modifying a focus, modifying saturation, combining, modifying contrast, cropping, darkening, deleting, enhancing a value, filtering, manipulating, masking, modifying, overlaying, resizing, rotating, scaling, sharpening, softening, transforming, and translating.

13. The method of claim 11 wherein receiving the input further comprises providing a user interface within a web browsing application.

14. The method of claim 11 wherein receiving the input further comprises input from at least one of an automated program, an independent user, multiple independent users, and users in collaboration.

15. The method of claim 11 wherein the display is one of: a laptop computer, a desktop computer, a server computer, a tablet computing device, a surface computing device, a video game console, a mobile phone, a personal digital assistant, a digital camera, a pager, and a smart phone.

16. The method of claim 11 wherein the modified representation is dynamically affected should said source image be changed.

* * * * *